Feb. 28, 1933.

F. J. DAY

AIR CONDITIONING MEANS

Re. 18,755

Original Filed Aug. 7, 1929 2 Sheets-Sheet 1

INVENTOR
FRED JOHN DAY

BY Raymond L. Barton
ATTORNEY

Feb. 28, 1933.

F. J. DAY

AIR CONDITIONING MEANS

Re. 18,755

Original Filed Aug. 7, 1929 2 Sheets-Sheet 2

INVENTOR
FRED JOHN DAY
BY
Raymond L. Barton.
ATTORNEY

Reissued Feb. 28, 1933

Re. 18,755

UNITED STATES PATENT OFFICE

FRED JOHN DAY, OF LOS ANGELES, CALIFORNIA

AIR CONDITIONING MEANS

Original No. 1,842,660, dated January 26, 1932, Serial No. 384,134, filed August 7, 1929. Application for reissue filed August 9, 1932. Serial No. 628,099.

In this specification, and the accompanying drawings, I shall describe and show a preferred form of my invention, and shall specifically mention certain of its more important objects. I do not limit myself to the forms described, since various changes and adaptations may be made therein without departing from the essence of my invention as hereinafter claimed, and objects and advantages, other than those specifically mentioned, are included within its scope.

This invention relates to improved equipment for treating perishable products.

In the shipping of perishable products, or in their preparation for subsequent transportation, it is unavoidable that the fruit or vegetable as it comes from the field contains latent or field heat, and that this temperature or latent heat is withdrawn in order to arrest further maturity and bring about a state of preservation whereby growth will be immediately retarded, thus eliminating the action of fungi and preventing deleterious growths.

This treatment consists in conditioning the air in such a manner as will quickly reduce the temperature thereof through means having a low cost and which is simple to install and easy to operate.

It is also considered a part of this invention to heat or condition the air in the winter time with the same apparatus by installing an auxiliary heating medium in the ice bunker.

In treating perishable products in this manner it is desirable to pre-cool refrigerator cars prior to the storing of the fruit, and it is one advantage and a prime object of the invention to pre-cool the car first by using the cool night air and especially during the process of loading and transporting, such reduction of temperature in the car being sufficient for removal of the field or latent heat and thus causing no delay by awaiting any auxiliary means for pre-cooling.

Especially is the present invention of paramount importance for its facility of installation on cars remotely switched in yards where railroad tracks make them inaccessible to the approach of automobiles equipped with pre-cooling apparatus and where other means for pre-cooling is impractical.

After refrigerator cars are initially iced it has formerly required from six to seven hours to pre-cool them. With the present method this time has been greatly reduced and in the transportation of some vegetables, such as cauliflower, it is not necessary to replenish the ice used in pre-cooling.

Cauliflower is packed for shipment at a field heat or pulp temperature of from sixty degrees to seventy degrees Fahrenheit, cantaloupes from ninety degrees to one hundred degrees Fahrenheit.

Such fruit unless properly introduced at a low temperature will deteriorate and decay because the pulp temperature would cause the fruit to develop beyond the proper state of maturity.

Furthermore, cauliflower unless properly pre-cooled will continue growing, causing spread ricey heads and jackets to turn yellow, and other fruit and vegetables also need pre-cooling to prevent continued growth or becoming over-ripe.

Such conditions existing in fruits and vegetables diminish the richness of their flavor and consequently reduce the quantity and value of the sale thereof.

Experiments with strawberries have shown that within twenty-four hours they start deteriorating on account of retaining their pulp temperature or field heat. With the present improved invention fruits of this character can be pre-cooled in three or four hours, shipped to distant markets and arrive in the same condition as when they started.

Peaches picked from trees unless pre-cooled, will start to rot in two or three days after being placed in cold storage. Such fruits as hereinbefore described, when pre-cooled before shipping arrive at their destination at the same pre-cooled temperature which is steadily maintained during transit with saving of ice of from thirty-five to fifty percent in the summer months when standard refrigeration is necessary. Peaches, pears, plums, and other fruits can be permitted to remain on the trees or vines until they come closer to a fully ripe condition, thereby permitting the fruit sugar to form in larger quantity and a better flavor to be developed, and then, if pre-cooled and kept cool by the method and apparatus of this invention, can still be safely shipped to their final destination.

An object of my invention is to provide an improved system which may be employed in refrigerator cars for bringing the air circulation to the floor line and also creating a rapid induced circulation within the car by the aid of the suction fan at the ceiling discharging downwardly thru the ice bunker.

The air delivered at the floor line and leaving the ice bunker with fair velocity will distribute throughout the car because of the natural circulation and path of travel of the air currents under the influence of the fan. By reason of this circulation a uniform temperature is maintained throughout all parts of the car, as well as throughout the entire load.

Further objects may hereinafter appear when viewed in the light of the description following taken in conjunction with the accompanying drawings which illustrate what is at present deemed to be a preferred embodiment of the invention and wherein, Fig. 1 is a perspective view of the complete apparatus as applied to a refrigerator car, parts being broken away to show interior construction.

Figures 1, 2, 3:
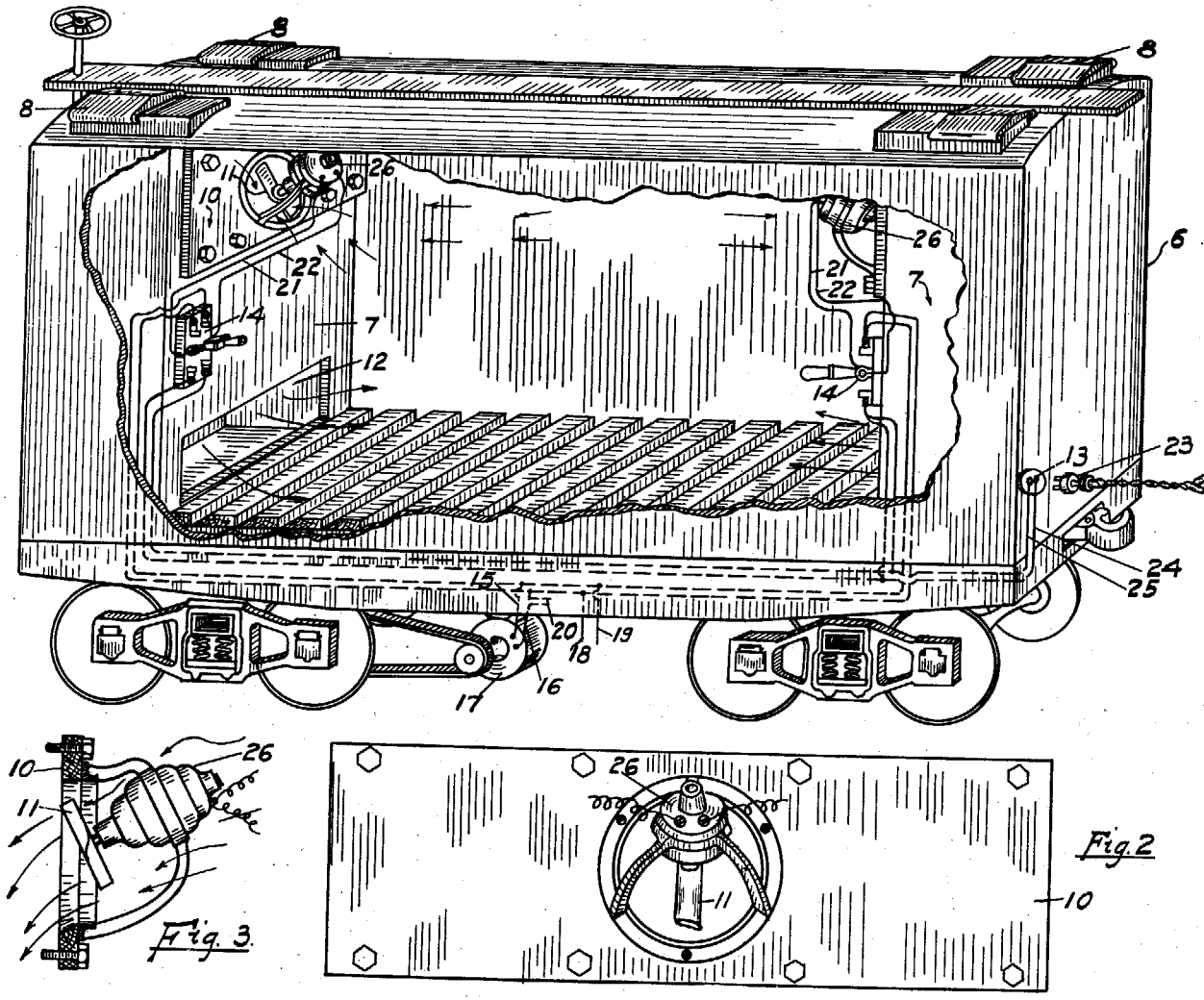
Fig. 2 is a perspective view of the detachable panel and its fan mounting attachments.
Fig. 3 is a mid-sectional view of Fig. 2.
Figure 4:
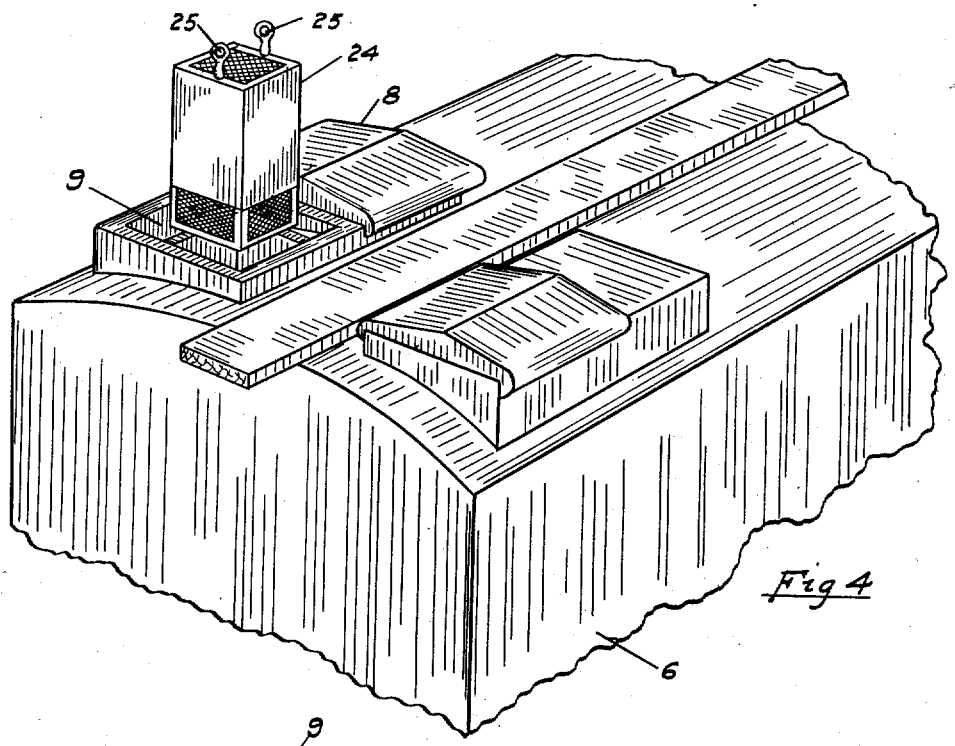
Fig. 4 is a perspective view showing method of installing a preferred type of heater within the ice bunker for winter service.

The ice bunkers 7 in standard construction each have a top and a bottom opening. In the present invention the top opening is closed with a panel 10 upon which is centrally mounted a suction fan 11 which is positioned to draw the air from the interior of the car and direct it downwardly thru the ice bunker and out at the bottom opening 12, thus providing an air current as indicated by the numerous arrows.

The panel 10 is easily detachable together with the fan mounted thereon when not required for service.

The panel runs athwart the car and is applied directly to the flange wood of the framework surrounding the top opening which it completely covers.

When it is desired to use the cool night air for cooling purposes, the hatch covers 8 are opened and the fan 11 is operated to create a downward current of air, thereby entraining the fresh, cool, outside air downwardly thru the ice bunker and thereon into the car, thus intermingling it with the comparatively hot, foul air in the inside of the car.

During transit and after the bunkers are iced, an even temperature is maintained by thermostatic control devices which are not shown and not considered a part of this invention, they now being standard equipment.

The fans may be operated by alternating current when the cars are side-tracked in the switch yards, or direct current from the motor generator 17 while in transit, their operation being automatically governed by thermostatic control.

For the alternating current I provide a connector plug 13 on the car. Said plug 13 has wires 24 and 25 connecting with a two-way switch 14. For direct current I provide wires 15 and 16 running to the motor generator 17 and also wires 18 and 19 leading to a storage battery (not shown). In the D. C. line is a cutout switch 20 which is automatic and of conventional design.

The motor 26 is provided with a current supply thru wires 21 and 22 connecting with the two-way switch 14. The two-way switch 14 is provided to make either electrical connection, as desired.

The detachability and portability of the panels 10 make the apparatus particularly applicable to refrigerator cars in transit and also while the cars are being switched from one yard to another before departure. The device can be kept in constant use by removing it from a car as soon as such car and its contents have been pre-cooled to the proper degree, and then placing it on another car where its use is required. Or it may be used on a car during an entire transcontinental trip, operating it under the regulation of a thermostat, to maintain an even temperature.

For the reverse condition using heat, the electric heater 24′ is let down within the ice bunker 7 by means of a pair of eye connections 25′, and rests on the removable steel ice grate bars 27 so as to be in the path of the air current under direction of the fan.

Figure 5:
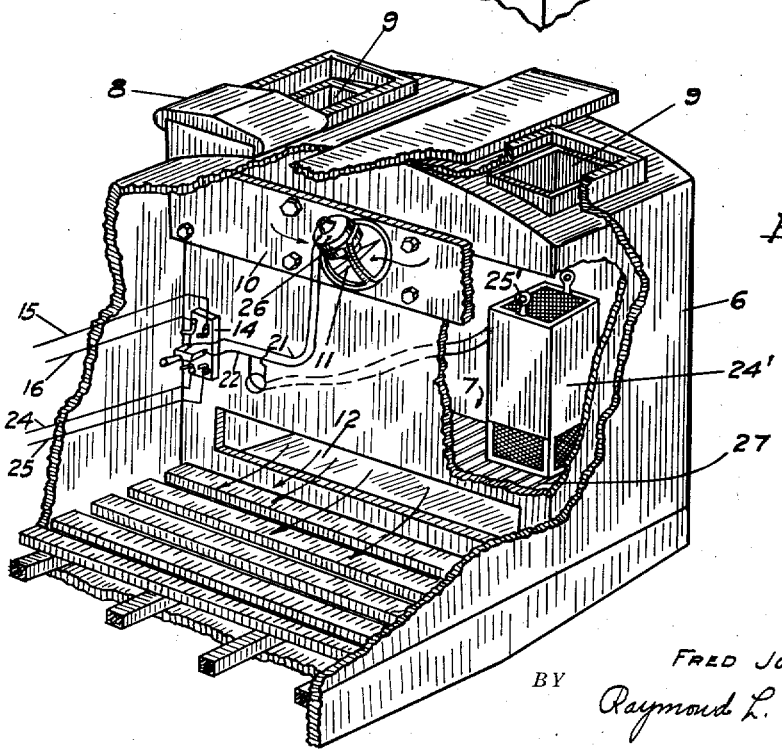
Fig. 5 is a perspective view showing the heater properly installed and apparatus ready for use.

When properly installed, as in Fig. 5, the same operation of the fan that is used for pre-cooling and cooling in the summer time is replaced for pre-heating and heating when the temperature falls below freezing in the winter time.

Although only one fan and one heater are shown it is to be understood two may be used if found more expedient.

In operation other than cool night air cooling, after the bunkers 7 have been filled properly with ice, and after the hatch covers 8 have been replaced, the entire portable apparatus comprising the panel 10 and motor driven fan 11 is or has previously been installed as shown in Fig. 1. The proper electrical connection is then made by either connecting the plug 23 to connections 13 or operating switch 14 to connect with the motor generator 17 or connection may be made to a storage battery not shown.

The circuitous path taken by the air in performing its cooling function is indicated by the arrows in Fig. 1.

In order to hasten the pre-cooling process salt is sprinkled upon the ice in the bunkers, causing a copius flow of water therefrom and also causing the air to become more rapidly cooled as it passes through said bunkers.

The apparatus not only operates efficiently, but its portable portion is readily connected to and disconnected from the standard type of refrigerator car now in general use.

I claim:

1. In a refrigerator car, the combination with an ice bunker having an upper opening affording communication between the ice bunker and the interior of the car; of a detachable panel adapted to overlie said opening, a fan mounted upon and supported by said panel, there being an aperture through said panel adapted to direct a current of air created by said fan from the upper interior portion of the car through said panel into said bunker.

2. In a refrigerator car, an air conditioning means comprising in combination, an ice bunker, a hatch in the top of said ice bunker, there being an opening both at the top and bottom in the bunker partition wall affording communication between said ice bunker and the interior of the car, a detachable panel adapted to overlie said top opening, there being an aperture in said panel and a fan mounted upon and supported by said panel adjacent said aperture and said hatch to move air from the upper interior portion of the car through said aperture and force said air downwardly into said ice bunker and thence into the car and adapted to entrain outside air through said hatch to intermingle with the current of air thus created, said fan being adapted to recirculate through said ice bunker air withdrawn from said car to be again intermingled with said outside entrained air.

3. In a refrigerator car, the combination with an ice bunker having an upper opening affording communication between the ice bunker and the interior of the car; of a detachable panel adapted to overlie said opening, a fan mounted upon and supported by said panel, there being an aperture through said panel adapted to direct a current of air created by said fan through a path extending through said ice bunker and the interior of said car.

4. In a refrigerator car, the combination with an ice bunker having openings affording communication between the ice bunker and the interior of the car; of a detachable panel adapted to overlie one of said openings, said panel having an aperture, a fan mounted in said aperture to direct a current of air created by said fan through a path extending through said ice bunker and the interior of said car, and a motor on the outside of said panel for driving said fan.

5. In a refrigerator car, the combination with an ice bunker having upper and lower openings affording communication between the ice bunker and the interior of the car, of: a detachable panel adapted to substantially close said upper opening; a fan carried by said panel adapted to produce a flow of air through a path extending through said ice bunker and the interior of said car; and means for detachably securing said panel in a position to substantially close said upper opening.

6. In a refrigerator car, the combination with an ice bunker having openings affording communication between the ice bunker and the interior of the car, of: a detachable panel adapted to substantially close one of said openings, said panel having an aperture; a fan carried by said panel in connection with said aperture to produce a flow of air through a path extending through said ice bunker and the interior of said car; and means for detachably securing said panel in a position to substantially close said one of said openings.

In testimony whereof, I have hereunto set my hand at Los Angeles, Los Angeles County, California, this 20th day of July, 1932.

FRED JOHN DAY.